April 8, 1969 R. O. TEEG ET AL 3,438,022

THERMOCHROMIC DISPLAY DEVICE

Filed July 7, 1966

INVENTORS
ROBERT O. TEEG
ROBERT W. HALLMAN

BY Claude A. Patalidis
ATTORNEY

United States Patent Office 3,438,022 Patented Apr. 8, 1969

3,438,022
THERMOCHROMIC DISPLAY DEVICE

Robert O. Teeg, Grosse Pointe Farms, and Robert W. Hallman, St. Clair Shores, Mich., assignors to Teeg Research, Inc., Detroit, Mich., a corporation of Delaware Filed July 7, 1966, Ser. No. 563,570
Int. Cl. G11b 7/24
U.S. Cl. 340—324 8 Claims

ABSTRACT OF THE DISCLOSURE

A thermochromic display board comprising principally a thin film of a material having a thermotropically reversible reflectivity change provided with a finite hysteresis, such material being a vanadium suboxide of the general formula $VO_x$ in which $x$ is comprised between 1.5 and 2.02, heating means maintaining the temperature of the thin film within its thermal hysteresis range and means for "switching" the reflectivity of the thin film by locally increasing its temperature above the higher transition temperature or by locally decreasing its temperature below the lower transition temperature. Information can thus be written on the board, altered, partially erased or completely erased.

The present invention relates to a display device for storage of information, and more specifically the invention relates to a thermochromic display device for the temporary, semipermanent and permanent storage of information on a medium exhibiting a thermotropic reversible reflectivity change at predetermined temperatures.

There is a great need at the present for display devices capable of providing more or less permanent storage of information in a reusable and erasable manner. Such display devices may be used in commercial as well as military applications in the form of plotting boards, display screens, chart representations and other graphic information, printers, etc. Erasable magnetic recording of information, generally in an invisible form requiring transducing means at the interface between the recording and a human have now reached a very advanced state in the art, but the erasable recording of temporary, semipermanent or permanent information of a directly visible image nature is still somewhat rudimentary.

United States Patent No. 3,219,993, issued Nov. 23, 1965, to Frederick A. Schwertz, contemplates a device utilizing a recording layer of a thermotropically color-reversible material exhibiting a hysteresis effect in conjunction with a plurality of Peltier junctions or other devices capable of adding and subtracting heat from small sections of the recording layer or selected portions thereof. Sections of the color reversible layer are thus caused to change in color when they are brought up to a certain temperature and they may be caused to return to their original color when brought down below a significantly lower temperature. It is suggested in the patent that a mixture of copper mercuric iodide and silver mercuric iodide in a binder of methyl-methacrylate be used to make a layer of thermotropically color-reversible material, changing its color from yellow-orange at room temperature to red when heated to 70° C. The patent also suggests using certain organic materials such as bianthrone and its vinylene homologs as well as members of the dianthrone and spiran series.

The present invention may be considered as an improvement on U.S. Patent 3,219,993 by providing means for maintaining the temperature of a thermochromic display layer within its chromic hysteresis curve between its lower and higher temperatures of transition so that a small amount of heating or cooling energy, as the case may be, is required for discretely locally changing the color of the layer surface, or more exactly its relative reflectivity to predetermined visible or invisible light frequencies, so as to provide an image display which remains permanently recorded on the layer surface until the temperature thereof is uniformly returned to a temperature just below the lower or just above the higher temperature of transition, as the case may be.

In addition, the present invention contemplates enhancing the visibility of the display image to a human observer by illuminating the surface of the display board with a monochromatic light, or, alternately, with a polarized light and observing the surface of the display board through a polarized light analyzer. In addition, the present invention contemplates using a thermocromatic layer a thin film of a vanadium suboxide which presents the advantages of exhibiting well defined thermotropically induced chromatic changes, which is endowed with a well defined hysteresis loop, and which provides an image having substantial contrast with respect to the surrounding portions and background coloration of the display surface.

Accordingly, it is the principal object of the present invention to provide a novel information display device utilizing a thermochromic material.

It is another object of the present invention to provide a recording medium capable of producing directly visible image information in a semipermanent nature such that the image is easily erasable.

It is among the further objects of the invention to provide a thermochromic recording medium having a reversible color or reflectivity hysteresis loop, to provide means for enhancing the visibility of such display by human eyes, for displaying such image information for indefinite periods of time, for erasion of such information at will in part or in whole and for replacement by a different image information.

Other objects and advantages of the present invention will become apparent upon reading of the description of examples of preferred forms thereof, with reference to the accompanying drawings wherein like reference numerals refer to like or equivalent parts, and in which.

Figures 1, 2, 3, 4:
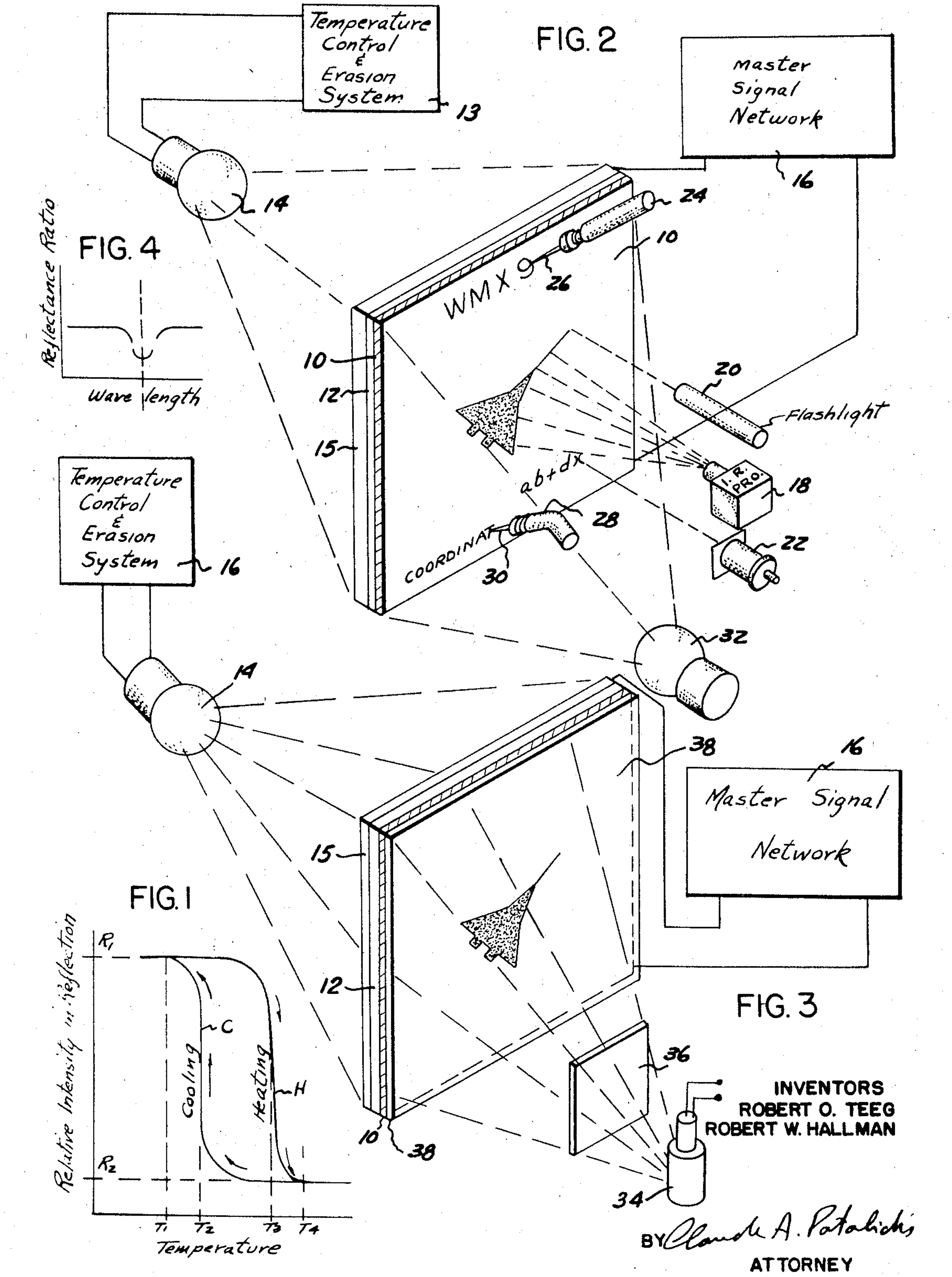
FIG. 1 is a typical thermochromatic hysteresis loop of a medium according to the invention.
FIG. 2 is a schematic representation of a display device according to a form of the present invention.
FIG. 3 is another representation of a display device according to a modification of the form of the invention shown in FIG. 2.
FIG. 4 is a reflectance ratio versus wavelengths of illumination light of a display medium according to the present invention.

The present invention contemplates using as a display medium a thin film, that is a film being about one to ten microns in thickness, prepared by vacuum deposition or other techniques well known in the art as well as disclosed and claimed in copending application Ser. No. 358,065, filed Apr. 7, 1964. Such thin film layer may be made of any of the well known thermotropic color changing media, but preferably it is made of a vanadium suboxide of the general formula $VO_x$ wherein $x$ is a number comprised between 1.5 and 2.02, an example of such suboxide of vanadium being vanadium dioxide, $VO_2$.

Thin films of vanadium dioxide, and other suboxides of vanadium, generally appear light grey below their lower transition temperature and turn to a dark blue-black color when heated above their higher transition temperature. Consequently, image display on a thin film of suboxide of vanadium presents a remarkable contrasting effect between the color or reflectivity of the displayed information and the surrounding background of the display surface. The transition temperatures of media included in the vanadium-oxygen system, or vanadium suboxides, may be varied by chemical composition and/or stoichiometry. Vanadium-oxygen system thin films have thus been prepared by applicants which exhibit transition temperatures at as low as about 25° C. and as high as about 70° C. Thermochromic hysteresis observed in such films may be controllably made to vary from a range of about 3° to a range of about 10° C. In this manner, a family of thermochromic materials in thin film forms presenting diverse chraracteristics which may be desirable for visual information recording, display and erasing has thus been produced, giving an infinite choice of quantitative and qualitative visual display aspects.

The thermochromic change experienced by such materials seems to be the result of a structural transition within the range bracketed by the lower and higher transition temperatures. As shown in FIG. 1, the thin film of thermocromic material exhibits a predetermined relative reflectivity R1 when maintained at a substantially low temperature, below T1. When its temperature is raised above T1 all the way to T4 for example, its relative reflectivity remains substantially R1 until it suddenly and abruptly changes to R2. The abrut change in reflectivity, effected at temperature T3 which is the higher transition temperature for the thermochromic material, causes the relative reflectivity to become substantially R2. It is preferable that the temperature of the material be raised to a temperature such as T4, higher than T3 in order to assure complete change of relative reflectivity. If the material is now cooled, its relative reflectivity R2 does not change back to R1 upon reaching about T3, the higher transition temperature, but it is necessary to cool the material to a temperature T2, lower than temperature T3, which corresponds to its lower transition tempertaure at which the material experiences a sudden and abrupt change of relative reflectivity from R2 back to R1. Curves H and C, of the chart of FIG. 1, illustrating respectively the change in relative reflectivity upon heating and the change in relative reflectivity upon cooling of the material, are non-coincidental and represents the thermochromatic hysteresis of the material, having thus an hysteresis loop comprised between T2 and T3. It can consequently be seen that if the entire surface of a thermochromic thin film mtaerial is raised from a temperature below T2 to a temperature between T2 and T3 within the transition hysteresis loop and some finite discrete portions thereof are raised momentarily to a temperature above T3, the material surface displays an image defined by portions of material having a relative reflectivity R2 corresponding to the previously momentarily heated discrete local portions contrasting with respect to the remaining of the material having an unchanged reflectivity R1. It is evident that if the entire temperature of the mtaerial is first raised to a temperature T4, above the higher transition temperature T3, and subsequently maintained at a temperature between T2 and T3, an image may be displayed by discrete local cooling of portions of the material below the lower transition temperature T2.

A schematic representation of an example of application of thermochromic material to the display of visible image is shown in FIG. 2. The display board comprises a thin film of thermochromic material, preferably a suboxide of vanadium, as shown at 10, such thin film being normally deposited on a substrate 12 which may be glass or other adequate support, substrate 12 being generally used where some rigidity of the display board needs be provided, though the substrate may be dispensed with in certain applications. The thin film surface is heat soaked by flooding the whole surface thereof by means of radiant energy provided by energy emitter 14 under the dependence of a temperature control and erasion system 13, such as to maintain the temperature of the display board between the lower and higher transition temperature of the thin film mtaerial. Information is recorded or "written" by any appropriate means capable of discretely locally heating the thin film 10 slightly above its higher transition temperature.

Such "writing" or recording of the display information may be effected by any one of several means, either individually or in combination, a few examples of such means being illustrated on FIG. 2. For example, the information may be recorded by means of a recording matrix 15 comprising a plurality of regularly disposed heating elements individually and successively or cojointly actuated by a control means such as master signal network 16, the individual heating elements of recording matrix 15 being of any appropriate form that may even comprise heating and cooling elements such as Peltier junctions and the like. The surface of the thermochromic thin film may also be raised in temperature above its higher transition temperature by means such as an infrared, or the like, energy projector, as shown at 18, which may be adapted to project a radiant energy image upon the surface of the display board, or, alternately which may be arranged to project a pencil beam of energy which is thus used to write or draw information upon the display board as would be done with an ordinary writing instrument such as a pencil or a chalk upon an ordinary display board, but without any contact between the writing instrument and the board, such energy beam projecting instrument being shown as a "hot" flashlight illustrated at 20. Alternately, other heat producing writing instruments, such as an ion beam projector, or the like, may be used, as shown at 22 schematically representing an ion beam generator adapted to project an energy radiating image upon the display board surface or alternately adapted to write information or draw information by adequate longitudinal and lateral displacement of the beam of energy.

Alternately, information may also be written or drawn upon the board by means such as a "hot" pencil 24 provided with a writing point 26 having a heating element capable of raising the surface of the thin film locally at a temperature above the higher transition temperature of the thermochromic material. The heating element in the writing point 26 may consist of a Peltier junction so that the same instrument, by reversal of the current flow through the junction, can be used as a discrete eraser for locally erasing information by cooling adequate portions of the thin film surface below the lower transition temperature of the thermochromic material. Another means of discretely raising the temperature of the thin film above its higher transition temperature by means of a writing instrument may be by way such as an ultrasonic pencil 28 which may be manually held and which is provided with a vibrating point 30 adapted to raise, by ultrasonic "hammering," the surface of the thin film where it is desired to inscribe information to a temperature above its higher transition temperature.

The information displayed by the display board of FIG. 2 remains displayed as long as desired, since the thermal hysteresis of the thin film prevents changing of the locally previously heated portions of the thermochromic material from one relative reflectivity to its other relative reflectivity until the flood source 14 maintaining the overall temperature of the board between the higher and the lower transition temperatures, i.e. between T2 and T3 of FIG. 1, is momentarily turned off for the purpose of erasing the information by dropping the temperature of the whole display board below the lower transition temperature of the thermochromic material of the thin film display surface.

The information displayed by a board according to the present invention is readily visible to the human eye, but in the event that it is desired to further enhance the contrast between the displayed information and the board background coloration, monochromatic illumination of the board may be used to advantages for that purpose. As shown in FIG. 2, a monochromatic illumination source 32 may be disposed in such a manner as to uniformly illuminate the surface of the display board so as to render the information displayed thereon more visible to the human eye because, as shown in FIG. 4, the reflectance ratio between the background chromatic state of the display thin film and the thermotropically induced chromatic change of the surface portions displaying the information varies in function of the wavelengths of the illumination energy. In this manner, by proper choice of the illumination energy wavelength, the contrast of the images displayed by the display board of the invention may be maximized. It has been found that wavelengths in the red to infrared region is particularly advantageous, and it is evident that, in some applications, the same source 32 may be used for illumination and heat flooding of the display board.

An alternate way of enhancing the contrast between the displayed image and the background is schematically illustrated in FIG. 3 where the source of illumination consists of a source of visible light 34 provided with a polarizer 36 so as to illuminate the display board with polarized light. The board is observed through a polarized light analyzer which may conveniently consist of an analyzer sheet or screen 38 covering the surface of the thermochromatic thin film 10 of the display board.

It can thus be seen that a display board device made according to the teachings of the present invention is capable of displaying visual information in a permanent form, to which further information may be added, and which may be erased or modified at will. The displayed information remains on the display board without deterioration for an indefinite period of time, and it may be erased at will in its entirety or in part and replaced by new information.

What is claimed as new is:

1. A thermochromic display device comprising a thin film of a material capable of experiencing a thermotropic reversible reflectivity change having a finite hysteresis loop bracketed by fixed transition temperatures, said material belonging to the group comprising vanadium suboxides of the general formula $VO_x$ wherein $x$ is comprised between 1.5 and 2.02, means for maintaining the temperature of said thin film between said transition temperatures, means for discretely locally changing the temperature of said thin film beyond one of said transition temperatures for displaying permanently stored information on said thin film by discrete local reflectivity change and means for erasing said information by returning the temperature of said thin film uniformly just beyond the other of said transition temperatures.

2. The device of claim 1 further comprising means for illuminating said thin film with monochromatic light.

3. The device of claim 1 further comprising means for illuminating said thin film with polarized light and means for observing said thin film through a polarized light analyzer.

4. The device of claim 1 wherein the means for changing the temperature of said thin film for displaying permanently stored information is adapted to discretely locally heat said thin film above the higher one of said transition temperatures.

5. The device of claim 1 wherein the means for changing the temperature of said thin film for displaying permanently stored information is adapted to discretely locally cool said thin film below the lower one of said transition temperatures.

6. The device of claim 4 further comprising cooling means for erasing said permanently stored information by momentarily returning the temperature of said thin film uniformly just below the lower one of said transition temperatures.

7. The device of claim 5 further comprising heating means for erasing said permanently stored information by momentarily returning the temperature of said thin film uniformly just above the higher one of said transition temperatures.

8. A thermochromic display device comprising a thin film of a material capable of experiencing a thermotropically reversible reflectivity change having a finite hysteresis loop bracketed by fixed transition temperatures, said material belonging to the group comprising vanadium suboxides of the general formula $VO_x$ wherein $x$ is comprised between 1.5 and 2.02, means for maintaining the temperature of said thin film between said transition temperatures, means for discretely locally changing the temperature of said thin film beyond one of said transition temperatures for displaying permanently stored information on said thin film by discrete local reflectivity change, means for illuminating said displayed information with light adapted to enhance the reflectivity contrast between said displayed information and the remaining of said thin film surface and means for returning the temperature of said thin film uniformly just beyond the other of said transition temperatures for erasing said information.

References Cited

UNITED STATES PATENTS

| | | | |
|---|---|---|---|
| 3,323,241 | 6/1967 | Blair et al. | 350—160 |
| 3,219,993 | 11/1965 | Schwertz | 340—324 |
| 2,882,631 | 4/1959 | Boone | 40—130 |

OTHER REFERENCES

Luckiesh: Color and Its Applications, Van Nostrand Co., 1915, pp. 286–287.

JOHN W. CALDWELL, *Primary Examiner.*

A. J. KASPER, *Assistant Examiner.*

U.S. Cl. X.R.

40—130; 88—14; 250—71